(No Model.) 2 Sheets—Sheet 1.
F. D. CABLE.
BICYCLE.
No. 494,803. Patented Apr. 4, 1893.
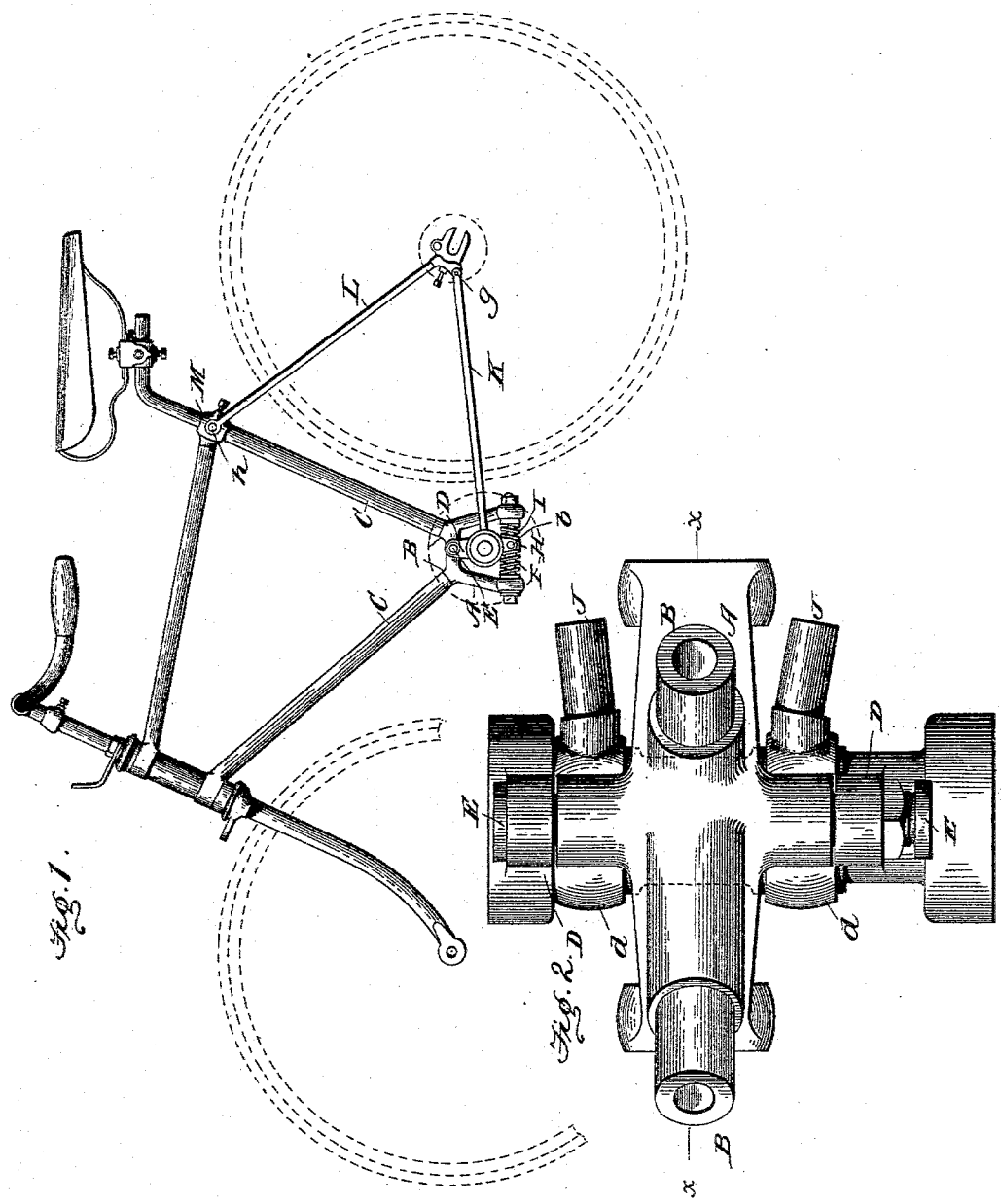
Witnesses
C. L. Bradford
Curtis Hammond
Frank D. Cable Inventor
By Wm. C.␣W. Suture
Attorney (No Model.) 2 Sheets—Sheet 2.
F. D. CABLE.
BICYCLE.
No. 494,803. Patented Apr. 4, 1893.
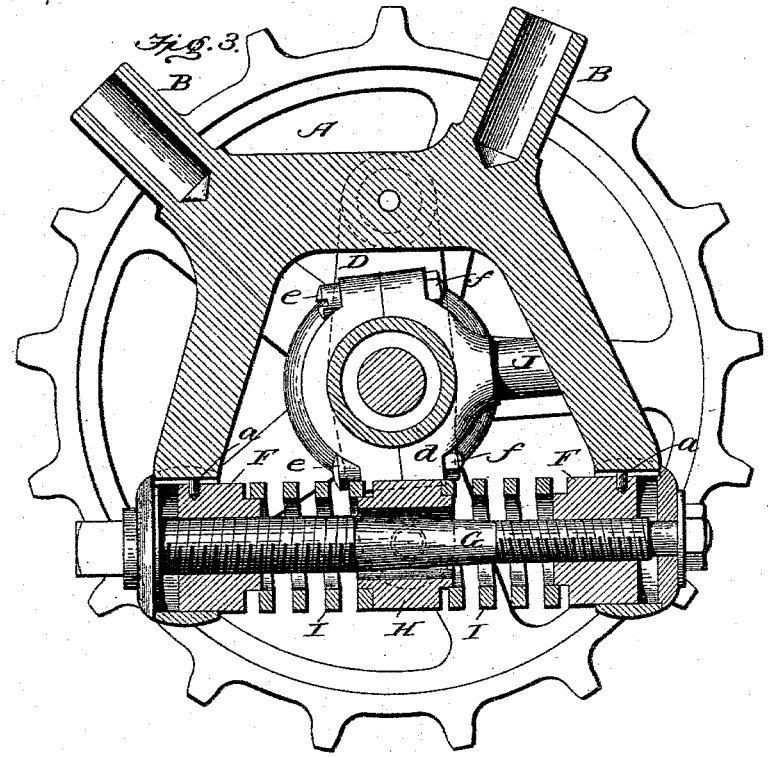
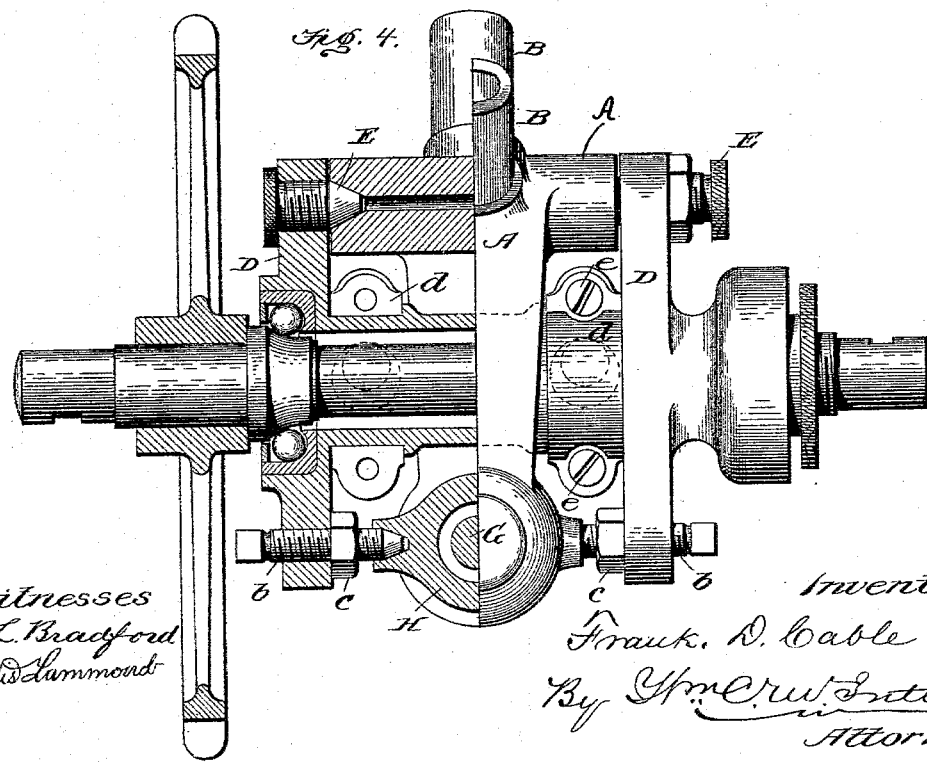
Witnesses
C. L. Bradford
Curtis Lammond
Inventor
Frank. D. Cable
By Wm C. McIntire
Attorney

UNITED STATES PATENT OFFICE.

FRANK D. CABLE, OF TOLEDO, OHIO, ASSIGNOR TO THE YOST MANUFACTURING COMPANY, OF SAME PLACE.

BICYCLE.

SPECIFICATION forming part of Letters Patent No. 494,803, dated April 4, 1893.

Application filed September 16, 1892. Serial No. 446,076. (No model.)

*To all whom it may concern:*

Be it known that I, FRANK D. CABLE, a citizen of the United States, residing at Toledo, in the county of Lucas and State of Ohio, have invented certain new and useful Improvements in Bicycles; and I do hereby declare the following to be a full, clear, and exact description of the invention, such as will enable others skilled in the art to which it appertains to make and use the same.

My invention relates to certain new and useful improvements in bicyles.

It has for its object to relieve the rider from all sudden jars in meeting obstruction to the wheels on the road, and to also relieve the frame from damaging strains; and with these ends in view my invention consists of the details of construction and arrangement of the several parts as will be hereinafter and in detail explained.

In order that those skilled in the art may fully understand my invention I will proceed to describe the construction and operation of the same, referring by letters to the accompanying drawings in which—

Figure 1 is a side elevation of a bicycle embodying the features of my invention. Fig. 2 is a plan view of the yoke and rear fork connections; Fig. 3 a vertical central section taken at the line $x, x$, of Fig. 1; and Fig. 4 is a front elevation of the same, showing one half in section.

Similar letters of reference indicate like parts in the several views.

A represents the yoke bracket with suitable connections B, B, by which the frame C, C, is connected to the bracket, the said frame being connected at other points in the usual manner.

D is the yoke which is pivoted to the yoke bracket A by cone pivots E which pass through and are held in place by lugs on the yoke as clearly shown in Figs. 2 and 4.

In the lower extremity of the yoke bracket A, in each arm thereof is arranged a sliding block F with a feather or pin $a$ adapted to project into a longitudinal groove or channel in each end of the bracket to prevent rotation of the said blocks. These blocks are bored centrally and provided with internal screw threads, one of them with a right hand thread, and the other with a left hand thread, adapted to receive corresponding right and left hand threads on a bolt G, the screw threaded portions of which differ in diameter and which is tapered at that portion between the threads for a purpose to be presently explained. One end of the bolt G is provided with a squared head by which it may be turned and with an annular shoulder to bear against the arm of the yoke bracket, while the other end is provided with a removable washer and nut as clearly shown at Fig. 3, so that the rotation in one direction or the other of the screw bolt G will cause the blocks F to approach or recede from each other. H is a central block also arranged on the bolt G and each end of this block H as well as the inside end of each of the blocks F are turned down to form a recess or shoulder to receive the end coil of two coil springs I, so that it will be understood that as the blocks F are caused to approach each other by turning the bolt G, the coil springs I will be compressed and their tension correspondingly increased, while the reverse movement of the bolt would produce a counter effect upon the springs. The bolt G is made smaller at one end than at the other, as shown, in order that when the screw thread of greatest diameter has been run out of the block F, the smaller end of the bolt which has a reverse thread upon it may be readily passed through said block. The yoke D, as before stated, is pivoted at its upper end to the yoke bracket, and at its lower ends it is provided with cone screw pivots $b, b$, and check nuts $c$, the inner tapered ends of the pivots $b$ seating themselves in corresponding depressions on each side of the central block H as most clearly shown at Fig. 4, thus maintaining said block in its central position. The yoke D is constructed in any ordinary or desired manner for the proper reception of the crank axle, ball bearings, &c., and is turned down each side of the center to form annular recesses to receive the straps $d$ connected with the rear fork connections K, as clearly shown at Figs. 3 and 4. The straps $d$ are made in two parts and are secured in position around the yoke by screw-bolts and nuts $e, f$, as clearly shown in Fig. 3. The rear forks K are secured in any ordinary manner to the connections J, on the straps $d$, and are hinged or pivoted at $g$ to the box or bracket in which the rear axle rotates, and the rear frame L is pivoted at its upper end as seen at $h$ (Fig. 1) to the saddle post bracket M.

It will be seen that the frame proper of the bicycle is rigidly connected to the yoke bracket and front fork, while the rear fork K is connected to the swinging or pendulum form yoke D, which is held in its normal vertical position between the ends of the yoke bracket A by the blocks F, F and H, and the coil springs I. From this construction and arrangement it will be understood that when the wheel is being ridden, if the front wheel should come in contact with an obstruction, the impact force of the blow will be transmitted rearward against the springs and blocks forcing the whole frame against the coil springs I, the frame rocking as it were upon the yoke D, or in other words forcing the yoke to rock on its cone pivots while the rear fork and frame K, L, move slightly upon their hinge connections, thus the rider is relieved of the solidity of the jar, and the machine from undue strain. Likewise, should the rear wheel be the one to meet an obstruction a similar action will ensue, the only difference being that in the former case the blow is a forcing blow while in the latter it is a pulling blow.

I do not wish to be limited to the exact details of construction which I have shown to illustrate my invention, as they may be greatly varied without departing from the gist of the same, which consists in the idea of swinging the crank axle yoke upon pivot bearings in the yoke bracket, connecting the lower end of the yoke to a movable spring block, and connecting the rear fork directly to the yoke, so that the yielding action described may take place.

What I claim as new, and desire to secure by Letters Patent, is—

1. In a bicycle, the combination with the front and rear portions of the frame, of a yoke bracket A, embracing within its lower legs a centrally arranged block H under spring tension, a crank axle yoke D pivoted at its upper end to the yoke bracket, and at its lower end to the spring controlled block H and a rear fork pivotally connected to the yoke D and the saddle post bracket M, whereby a spring motion is given to the frame when the wheel of the bicycle meets an obstruction, substantially as hereinbefore set forth.

2. The yoke bracket A embracing between its legs the right and left hand threaded bolt G, in combination with the blocks F, F, and H, and the coil springs I, whereby the tension of the springs may be varied, substantially as and for the purposes set forth.

3. The yoke D, pivoted at its upper end to the yoke bracket A by cone pivots and connected at its lower extremity to the central spring block H by adjustable cone pivots, in combination with the blocks F F and H, springs I, I, and a tension controlling device G substantially as and for the purpose set forth.

4. The combination and arrangement of the yoke D, rear fork connections J, secured to the yoke by split rings or straps and screw bolts, the rear fork K pivotally connected to the rear axle box, and suitable spring mechanism for restoring the yoke and its connections to their normal positions, substantially as described.

In testimony whereof I affix my signature in presence of two witnesses.

FRANK D. CABLE.

Witnesses:
CHAS. W. BOND,
E. W. TOTERTON.